Patented Apr. 5, 1949

2,466,665

UNITED STATES PATENT OFFICE 2,466,665

PROCESS FOR PURIFYING PTEROYL-
GLUTAMIC ACID

Coy W. Waller, Pearl River, N. Y., assignor, by mesne assignments, to American Cyanamid Company, New York, N. Y., a corporation of Maine No Drawing. Application February 13, 1946,
Serial No. 647,424

3 Claims. (Cl. 260—251)

This invention relates to a process of purifying a crude synthetically-produced biologically active substance.

In the copending application of John H. Mowat and myself, Serial Number 606,704, filed July 23, 1945, there was disclosed the preparation of a group of new compounds which possess interesting and useful biological properties. Of these, the compound N-[4-}-[(2-amino-4-hydroxy-6-pyrimido [4,5 - b]pyrazyl) methyl]-amino}-benzoyl]glutamic acid is of particular value because if its vitamin-like properties and usefulness in stimulating haemoglobin formation and in the treatment of agranulocytosis and other related diseases.

As will be obvious, chemical compounds which are to be administered as therapeutic agents must be in a fairly high state of purity. Unfortunately, all of the presently known methods of synthesizing this new compound yield a relatively crude product containing a large proportion of unidentified chemical substances which may, or may not, be harmful. In any event, their removal by a comparatively simple and economical process is an important desideratum.

The process of preparing N-[4-}-[(2-amino-4-hydroxy - 6 - pyrimido[4,5 - b]pyrazyl) methyl] - amino}-benzoylglutamic acid employs as starting materials 2,4,5-triamino-6-hydroxy pyrimidine, para-aminobenzoylglutamic acid, and alpha, beta-dibromopropionacetal, as described in the application of Waller and Mowat mentioned above, or some other related substance having appropriate reactive and activating groups. As will be understood by chemists, familiar with the chemistry of heterocyclic organic compounds of this type, and as has been found by experience, numerous side reactions occur along with, or following, the principal reaction. Accordingly, the reaction product contains a relatively large proportion of undesired substances, including unreacted intermediates, condensation and/or polymerization products of two or more of the intermediates, position isomers, oxidation products, various hypothetical degradation products, products of hydrolysis, and the like. Most of these substances are biologically inactive and should be removed from the desired product of the reaction.

Because of the fact that many of the undesirable products possess some of the same chemical and physical properties of the biologically active product, it has been found extremely difficult to separate the impurities without causing an alarming loss of the active material. Methods of purification involving the preparation of certain insoluble metal salts, repeated recrystallizations, concentration, extraction with organic solvents, treatment with activated charcoal, etc., have been employed to obtain a material of satisfactory purity, but the many manipulative steps of these processes are a considerable disadvantage in the commercial production of the therapeutic agent.

It is one of the objects of the present invention, therefore, to provide a simple and economical method of purifying the crude synthetic product named above to a state of purity sufficient for most purposes but without the disadvantage of numerous recrystallizations, solvent extraction, salt formation, and the like which have characterized other processes. It is also an object of the invention to provide a process by which crude, synthetically produced N-[4-}-[(2-amino-4-hydroxy-6-pyrimido[4,5-b]pyrazyl)methyl]-amino}benzoyl]glutamic acid may be separated from the accompanying side reaction products and other impurities without undue loss of the valuable component of the reaction mixture.

These objects and others which will appear hereinafter are accomplished by the process of the present invention. By this process a crude reaction mixture containing N-[4-}-[(2-amino-4 - hydroxy - 6-pyrimido[4,5-b]pyrazyl) methyl]-amino}-benzoyl]glutamic acid and other related pterins, unreacted intermediates, and other unidentified substances resulting from the various chemical reactions which may occur under the conditions of the synthesis, is dissolved in water, either hot or cold, at a pH above 9. Any alkaline substance may be used which makes it possible to obtain a pH above 9, preferably 10 to 12. The amount of the biologically active compound, N - [4 - } - [(2-amino-4-hydroxy-6-pyrimido[4,5-b]pyrazyl)methyl] - amino} - benzoyl]glutamic acid, should be carefully regulated so that the resulting solution contains from about 0.1 to 0.6 mg. per ml. The actual amount of the biologically active substance in the crude material may be easily determined by a preliminary bioassay. Although it is possible to dissolve considerably more of the material in the alkaline solution, this seemingly desirable step is to be avoided, since high concentrations lead to the production of a less pure product.

The alkaline solution, at a pH above 9, is then brought to a pH of 7 by means of an acid or buffer or any other method which will reduce the pH to this point. Only a slight variation of pH of from about 6.5 to 7.5 is permissible if a high yield of pure product is to be obtained. As a result of the regulation of the pH at the concentrations just described, many of the impurities are precipitated from the solution in an insoluble form. An unavoidable but slight loss of the biologically active substance is suffered at this stage of the process by coprecipitation and adsorption on the insoluble impurities. The loss may be reduced by heating the solution, as high as the boiling point, when the hydrogen ion concentration is reduced to a pH of 7. It is desirable, however, to cool the solution to room temperature, or lower, at pH 7 before removing the precipitate by filtering, centrifuging, decantation or otherwise.

After removing the impurities at pH 7, the clear solution is brought to a pH between 3 to 4 and the N-[4-}-[(2-amino-4-hydroxy-6-pyrimido[4,5 - b]pyrazyl)methyl] - amino}-benzoyl]-glutamic acid precipitates in a state of higher purity. This product is of sufficient purity to make possible further purification by recrystallization from water or otherwise. The preferred procedure is to dissolve the material in boiling water, add filter aid such as Celite to the hot saturated solution, filter while hot, and then cool.

A further improvement in the purity of the product may be obtained by treatment with activated charcoal in an alkaline solution. In this phase of the process the partially purified product is dissolved in water at a concentration of 1 to 2 mg. per ml. at a pH above 9, preferably 10 to 12. A pH below 9 is to be avoided as, under these conditions, much of the product is adsorbed on the charcoal. The treatment with charcoal may be with either a hot or a cold solution.

The amount of charcoal used is determined by the amount of impurities present, a minimum being used because of adsorption of the desired product thereon. I have found that an amount of activated charcoal, such as Norite, may be used up to twice the weight of the biologically active material without considerable loss. After agitating the solution with activated charcoal for a short time, the solution is filtered, poured into enough boiling water to bring the concentration to about 0.3 mg. per ml., adjust the pH to 3–4, and filter. On cooling slowly, the product crystallizes in a relatively high state of purity.

To illustrate the process more clearly, the following example, giving actual proportions is given. 5.8 g. of a crude reaction product containing 18% by weight of biologically active material was dissolved in 3.5 liters of boiling water, using enough sodium hydroxide to bring the pH between 11 and 12. This hot alkaline solution was brought to a pH of 7 using dilute hydrochloric acid and then cooled to room temperature. Celite filter aid was added and the solution filtered to remove the precipitate which had formed. The clear filtrate was brought to a pH of 3, using dilute hydrochloric acid and the product was collected on Celite. The Celite cake was mixed with 200 ml. of water and enough sodium hydroxide was added to bring the pH up to 10–11. One gram of Norite was stirred into the mixture for 20 minutes. The Celite and Norite were filtered from the mixture. The filtrate was poured into 800 ml. of water and 20 ml. of glacial acetic acid was added. On cooling, crystals of N-[4-}-[(2-amino-4-hydroxy-6-pyrimido[4,5 - b]pyrazyl)methyl - amino}ben - zoyl]glutamic acid separated which, on assaying, were found to be 76.8% pure.

One-half gram of the product obtained above was dissolved in 1500 ml. of hot water, filtered through Celite, cooled, and the product filtered off. Two tenths gram of the isolated product was dissolved in 100 ml. of water and enough sodium hydroxide to bring the pH to about 10. This solution was treated with 0.4 gram of Norite and stirred for 20 minutes. The mixture was filtered free of Norite and poured into 600 ml. of hot water containing 10 ml. of glacial acetic acid. Three grams of Celite was added to the boiling solution which was then filtered, cooled, and the product isolated and dried. Analysis showed it to contain 92% of N-[4-}-[(2-amino-4-hydroxy-6 - pyrimido[4,5-b]pyrazyl)methyl]-amino}benzoyl]glutamic acid.

The process just described has been applied to the purification of crude reaction mixtures from various methods of synthesizing the active compound and it has been found to have universal application where the impurities associated with the synthesis are present. As will be seen, the method provides a simple means of obtaining a product from a crude mixture of sufficient purity for most purposes. Further purification can obtained by repeating the process outlined above.

I claim:

1. A process of purifying and separating N-[4 - } - [(2-amino-4-hydroxy-6-pyrimido[4,5-b]-pyrazyl)methyl]-amino}benzoyl]glutamic acid from biologically inactive impurities in a crude reaction mixture containing the same which comprises dissolving the crude reaction mixture in water at a pH above 9 to a concentration of real N-[4-}-[(2-amino-4-hydroxy-6-pyrimido-[4,5-b]pyrazyl)methyl]-amino}benzoyl]glutamic acid of between about 0.1 to 0.6 mg. per ml., adjusting the hydrogen ion concentration of the solution to about pH 7, removing insoluble impurities, and then adjusting the pH to within the range of about 3 to 4 to precipitate N-[4-}-[(2-amino-4-hydroxy - 6 - pyrimido[4,5 - b]pyrazyl)methyl - amino-}benzoyl]glutamic acid said substance having the structural formula

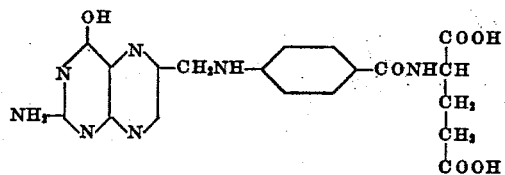

2. A process of purifying and separating N-[4 - } - [(2-amino-4-hydroxy-6-pyrimido[4,5-b]-pyrazyl)methyl]-amino}benzoyl]glutamic acid from biologically inactive impurities in a crude reaction mixture containing the same which comprises dissolving the crude reaction mixture in water at a pH above 9 to a concentration of real N-[4-}-[(2-amino-4-hydroxy-6-pyrimido[4,5-b]-pyrazyl)methyl]amino}benzoyl]glutamic acid of between about 0.1 to 0.6 mg. per ml., adjusting the hydrogen ion concentration of the solution to about pH 7, removing insoluble impurities, adjusting the pH to about 3 to 4 to precipitate N-[4-}-[(2-amino-4-hydroxy-6-pyrimido[4,5-b]pyrazyl)methyl]-amino}benzoyl]glutamic acid, redissolving the precipitated product in water at a pH above 9, adding to the solution a quantity of activated charcoal not in excess of about twice the weight of N-[4-}-[(2-amino-4-hydroxy-6-pyrimido[4,5 - b]pyrazyl)methyl] - amino}benzoyl] - glutamic acid contained therein, removing the charcoal and impurities adsorbed thereon from the alkaline solution, adjusting the pH of the solution to between 3 and 4 and recovering the precipitated product said substance having the structural formula

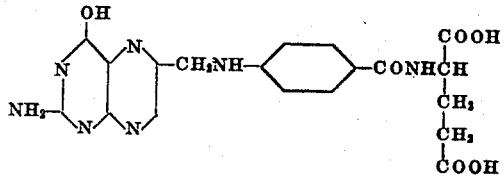

3. A method of improving the purity of impure N-[4-{-[(2-amino-4-hydroxy-6-pyrimido[4,5-b]-pyrazyl)methyl]-amino}-benzoyl]glutamic acid which comprises dissolving impure N-[4-{-[(2-amino-4-hydroxy-6-primido[4,5-b]pyrazyl)-methyl]-amino}benzoyl]glutamic acid in hot water at a pH above 9 to a concentration of real N-[4-{-[(2-amino-4-hydroxy-6-pyrimido[4,5-b]-pyrazyl)methyl]-amino}-benzoyl]glutamic acid of between 0.1 to 0.6 mg. per ml., adjusting the hydrogen ion concentration of the solution to between about pH 6.5 to 7.5, removing insoluble impurities, and then adjusting the pH to within the range of about 3 to 4 to precipitate N-[4-{-[(2-amino-4-hydroxy-6-pyrimido[4,5-b]pyrazyl)-methyl]-amino}-benzoyl]glutamic acid, said compound having the structural formula

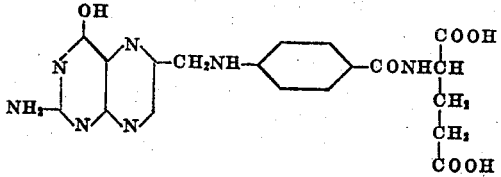

COY W. WALLER.

No references cited.